United States Patent
Hope et al.

(10) Patent No.: US 10,503,545 B2
(45) Date of Patent: Dec. 10, 2019

(54) UNIVERSAL SECURITY AGENT

(71) Applicant: AT&T Intellectual Property I, L.P., Atlanta, GA (US)

(72) Inventors: Edward Hope, Forked River, NJ (US); Daniel Solero, Mooresville, IN (US); Christopher Moran, Middletown, NJ (US); Frederick Henry Meyer, Oakhurst, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 294 days.

(21) Appl. No.: 15/486,118

(22) Filed: Apr. 12, 2017

(65) Prior Publication Data

US 2018/0302409 A1    Oct. 18, 2018

(51) Int. Cl.
| | |
|---|---|
| *H04L 29/06* | (2006.01) |
| *G06F 21/51* | (2013.01) |
| *G06F 9/48* | (2006.01) |
| *G06F 21/62* | (2013.01) |

(52) U.S. Cl.
CPC ............ *G06F 9/4881* (2013.01); *G06F 21/51* (2013.01); *G06F 21/62* (2013.01); *G06F 21/6281* (2013.01); *H04L 63/105* (2013.01); *H04L 63/20* (2013.01)

(58) Field of Classification Search
CPC ....... H04L 63/20; H04L 63/205; H04L 41/04; H04L 41/046; G06F 21/00; G06F 21/50; G06F 21/51; G06F 21/57; G06F 21/62; G06F 21/6281
See application file for complete search history.

(56) References Cited

U.S. PATENT DOCUMENTS

| | | |
|---|---|---|
| 5,958,016 A | 9/1999 | Chang et al. |
| 6,212,558 B1 | 4/2001 | Antur et al. |
| 6,317,838 B1 | 11/2001 | Baize |
| (Continued) | | |

FOREIGN PATENT DOCUMENTS

| | | |
|---|---|---|
| AU | 2005217992 B2 | 3/2007 |
| GB | 2411748 B | 10/2005 |

OTHER PUBLICATIONS

Metsch, Content-validation of Messages and Policy assurances for a Security-Proxy supporting Grid services, Diss. Berufsakademie Mannheim, Sep. 2005, 46 pages.
(Continued)

*Primary Examiner* — Daniel B Potratz
(74) *Attorney, Agent, or Firm* — King & Spalding LLP (57) ABSTRACT

A universal security agent deployed on a computing endpoint includes one or both of a base agent and a security agent plugin module. The base agent loads the security agent plugin module and, in response, receives plugin tasks from the security agent plugin module for registration. The base agent schedules the received plugin tasks based on a policy and/or a system access information associated with the security agent plugin module. Further, the base agent executes the plugin tasks based on the scheduling. The base agent controls system access requests generated during the execution of the plugin tasks based on the policy associated with the security agent plugin module. Additionally, the base agent monitors and logs system access information associated with the security agent plugin module.

20 Claims, 8 Drawing Sheets

(56) References Cited

U.S. PATENT DOCUMENTS

| | | |
|---|---|---|
| 6,550,012 B1 | 4/2003 | Villa et al. |
| 6,910,128 B1 * | 6/2005 | Skibbie .................. G06F 21/51 |
| | | 713/168 |
| 7,123,608 B1 | 10/2006 | Scott et al. |
| 7,225,255 B2 | 5/2007 | Favier et al. |
| 7,243,369 B2 | 7/2007 | Bhat et al. |
| 7,424,543 B2 | 9/2008 | Rice |
| 7,444,415 B1 | 10/2008 | Bazzinotti et al. |
| 7,596,806 B2 | 9/2009 | Chen |
| 7,934,251 B2 | 4/2011 | Hesselink et al. |
| 8,001,594 B2 * | 8/2011 | Heintz ................ H04L 63/0272 |
| | | 726/22 |
| 8,108,668 B2 | 1/2012 | Rozas |
| 8,122,495 B2 | 2/2012 | Ramsey et al. |
| 8,370,936 B2 | 2/2013 | Zuk et al. |
| 8,380,863 B2 | 2/2013 | Natarajan et al. |
| 8,566,248 B1 | 10/2013 | Steele et al. |
| 8,806,637 B2 * | 8/2014 | Saldhana ................ H04L 63/20 |
| | | 726/24 |
| 8,826,368 B2 | 9/2014 | Xiao et al. |
| 8,959,613 B2 | 2/2015 | Goel et al. |
| 9,021,254 B2 | 4/2015 | Bokarius et al. |
| 9,049,642 B2 | 6/2015 | Muhamed et al. |
| 9,553,895 B2 | 1/2017 | Li et al. |
| 2003/0200465 A1 | 10/2003 | Bhat et al. |
| 2006/0156398 A1 * | 7/2006 | Ross ..................... G06F 21/554 |
| | | 726/22 |
| 2007/0192867 A1 | 8/2007 | Miliefsky |
| 2011/0113484 A1 * | 5/2011 | Zeuthen .............. G06F 21/6281 |
| | | 726/19 |
| 2013/0242984 A1 | 9/2013 | Lee |
| 2013/0333040 A1 * | 12/2013 | Diehl ....................... G06F 9/46 |
| | | 726/24 |
| 2016/0294663 A1 * | 10/2016 | Veres ..................... H04L 41/22 |

OTHER PUBLICATIONS

Froh, IPsec, VPNs and the Dynamic VPN Controller (DVC), Mar. 2004, 43 pages.
Pulkkis et al., Current Network Security Technology, 2009, 9 pages.
Malmgren et al., A Comparative Study of Palo Alto Networks and Juniper Networks Next-Generation Firewalls for a Small Enterprise Network, Jun. 2016, 50 pages.
Bruce, Organizational Security Concerns: Analysis and Recommendations, Aug. 2010, 41 pages.

* cited by examiner

UNIVERSAL SECURITY AGENT

TECHNICAL FIELD

Embodiments of the present disclosure relate generally to computer security, and more particularly to a universal security agent.

BACKGROUND

As cloud computing gains popularity as a dominant way to approach information technology (IT) and various related services, security technologies are moving to an agent based architecture where lightweight security agents of centralized security controllers are deployed on computing endpoints to effectively protect data maintained by the various cloud computing resources. Different security agents may excel in different security capabilities and functions, and therefore, one computing endpoint may have multiple security agents deployed thereon to provide effective security to the computing endpoint. However, the presence of multiple security agents on a single computing endpoint may result in several undesirable complexities, such as, exposing privileged root level access of the computing endpoint to external software associated with several security agents from third party sources; and/or resource contention between the multiple security agents. Further, currently, computing endpoints lack transparency and/or control over operations of the multiple security agents, such as, operating system (OS) level system calls, and/or file and/or resource access.

SUMMARY

The present disclosure provides a technology, i.e., a universal security agent, for deployment on computing endpoints to addresses the above-mentioned undesirable complexities resulting from having multiple security agents on the computing endpoints. The universal security agent may generally refer to a framework that enables the security community, e.g., commercial vendors, open source, etc., to provide security technologies for computing endpoints in a secure modularized plugin model. In particular, the universal security agent provides, among other things, (a) fine-grained control of system resources across security plugins (without requiring direct private system access), (b) a scheduling mechanism for security plugin activity to avoid resource contention as well as allow for prioritization based on a plugin's policy, and/or (c) monitoring of plugin activity for auditing and dynamic feedback to scheduling.

In one example, a universal security agent comprises a base agent along with the one or more security agent plugin modules. The base agent and the one or more security agent plugin modules may be provided as a single installable package for deployment on a computing endpoint. In another example, the universal security agent includes only the base agent and the base agent may operate in concert with a universal security agent controller to dynamically discover the security agent plugin modules. In either case, the base agent loads and/or updates each security agent plugin module, provided an authenticity of the respective security agent plugin module is successfully validated. The loading may include loading the plugin object and plugin policy associated with each successfully validated security agent plugin module. After loading the security agent plugin modules, the base agent receives plugin tasks and corresponding execution requirements associated with each plugin task from each loaded security agent plugin module via a registration request from the respective loaded security agent plugin module. In response, the base agent validates the plugin tasks based on the plugin policies associated with the security agent plugin modules that are related to the plugin tasks. Upon successful validation, the base agent schedules and/or prioritizes the registered plugin tasks based on the execution requirements associated with the plugin tasks, the plugin policy associated with the corresponding security agent plugin modules, and/or system access information associated with the corresponding security agent plugin modules. The scheduling may be controlled such that a contention for simultaneous access of security resources between the plugin tasks is avoided.

Once the plugin tasks are scheduled, the base agent executes the plugin tasks based on the scheduling and to meet run-time requirements defined in the plugin policy of the security agent plugin modules related to the plugin task. Plugin tasks may request system access during execution, and the base agent controls system access based on whether the plugin policy associated with the security agent plugin modules related to the plugin tasks allows the requested system access. If such system access is not allowed in the policy, the base agent may send error reports to the corresponding security agent plugin module. Alternatively, if the system access is allowed, the base agent operates as a shim that handles all system requests.

The base agent provides policy inspection and enforcement for system access requests from the security agent plugin modules. Furthermore, the base agent may optionally consolidate and encrypt communications from the one or more security agent plugin modules to their respective controllers that are remotely located from the computing endpoint. The base agent may transmit the consolidated and encrypted communications to a proxy gateway as a single communication session over a common communication channel. The proxy gateway may transmit the communications to the respective controllers by masking the identity of the computing endpoint.

Because all security agent plugin module communications are configured to pass through and be monitored by the base agent, the universal security agent provides abstraction that limits or eliminates exposing privileged root level access of the computing endpoint to third party security agent plugin modules. Further, the universal security agent manages resource contention between the security agent plugin modules by scheduling the different security agent plugin tasks; and provides transparency and control over system access operations of the one or more security agent plugin modules by policy inspection and enforcement. In other words, the universal security agent provides a central point for integration and management of different security agents deployed in a computing endpoint to combine security solutions provided by the different security agents and provide a best-of-breed security solution for the computing endpoint.

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawings, wherein.

The drawings illustrate only example embodiments of the present disclosure and are therefore not to be considered limiting of its scope, as the present disclosure may admit to other equally effective embodiments.

DETAILED DESCRIPTION OF EXAMPLE EMBODIMENTS

In the following paragraphs, a universal security agent will be described in further detail by way of examples with reference to the attached drawings. In the description, well-known components, methods, and/or processing techniques are omitted or briefly described so as not to obscure the disclosure. Further, as used herein, the "present disclosure" refers to any one of the embodiments of the disclosure described herein and any equivalents. Furthermore, reference to various feature(s) of the "present disclosure" is not to suggest that all embodiments must include the referenced feature(s) or that all embodiments are limited to the referenced feature(s).

The universal security agent described herein may include a base agent and/or one or more security agent plugin modules that are configured to be deployed on a computing endpoint. The base agent and the security agent plugin modules may operate in a shared process space of the computing endpoint. In particular, the base agent may be logically disposed between the underlying operating system of the computing endpoint and the security agent plugin modules to provide a layer of abstraction. All communications from the security agent plugin modules to the underlying operating system of the computing endpoint and/or external controllers of the security agent plugins may be routed through the base agent that is configured to manage said communications such that the computing endpoint can enjoy the benefits of multiple security agents (e.g., best-of-breed security) without the undesirable complexities resulting from having the multiple security agents on the computing endpoint.

In one example, the security agent plugin modules may be configured as part of the base agent, while in other examples, the base agent may operate in concert with a universal security agent controller to dynamically discover each of the one or more security agent plugin modules. Responsive to discovery, the base agent may authenticate and then load the authenticated security agent plugin modules. The loaded security agent plugin modules may register their respective plugin tasks with the base agent. Upon receiving the plugin tasks from the loaded security agent plugin modules, the base agent may schedule and prioritize the execution of the plugin tasks based on the policies of the security plugin module associated with the plugin tasks, the system access behavior of the respective security agent plugin modules, and execution requirements provided by the security agent plugin modules at the time of registration. The scheduling and prioritization may be controlled such that contention for simultaneous access to resources of the computing endpoint is avoided. Furthermore, the base agent may control the access of system resources by the plugin tasks associated with various security agent plugin modules based on the policies associated with the respective security agent plugin modules. In particular, the base agent validates and ensures that a system access request by a security agent plugin module is allowed by the policies associated with the security plugin module. Additionally, the base agent may monitor and log the system access behavior of the different security agent plugin modules. Said system access behavior may be used to schedule the different plugin tasks of the security agent plugin modules as described above.

In some example embodiments, the base agent may also consolidate and encrypt the communications from the various security agent plugin modules to their respective controllers or other external entities for transmission to a proxy gateway as a single communication session. The proxy gateway may be configured to forward the communications to the respective controllers by masking an identity of the computing endpoint.

Technology associated with the universal security agent will now be described in greater detail with reference to FIGS. 1-8. First, FIGS. 1-3 will be discussed in the context of describing example operating environments and components associated with the universal security agent according to certain example embodiments of the present disclosure. Then, FIGS. 4-8 will be discussed, making reference back to FIGS. 1-3 as needed.

It will be appreciated that the various embodiments discussed herein need not necessarily belong to the same group of example embodiments, and may be grouped into various other embodiments not explicitly disclosed herein. In the following description, for purposes of explanation, numerous specific details are set forth in order to provide a thorough understanding of the various embodiments.

Figure 1:
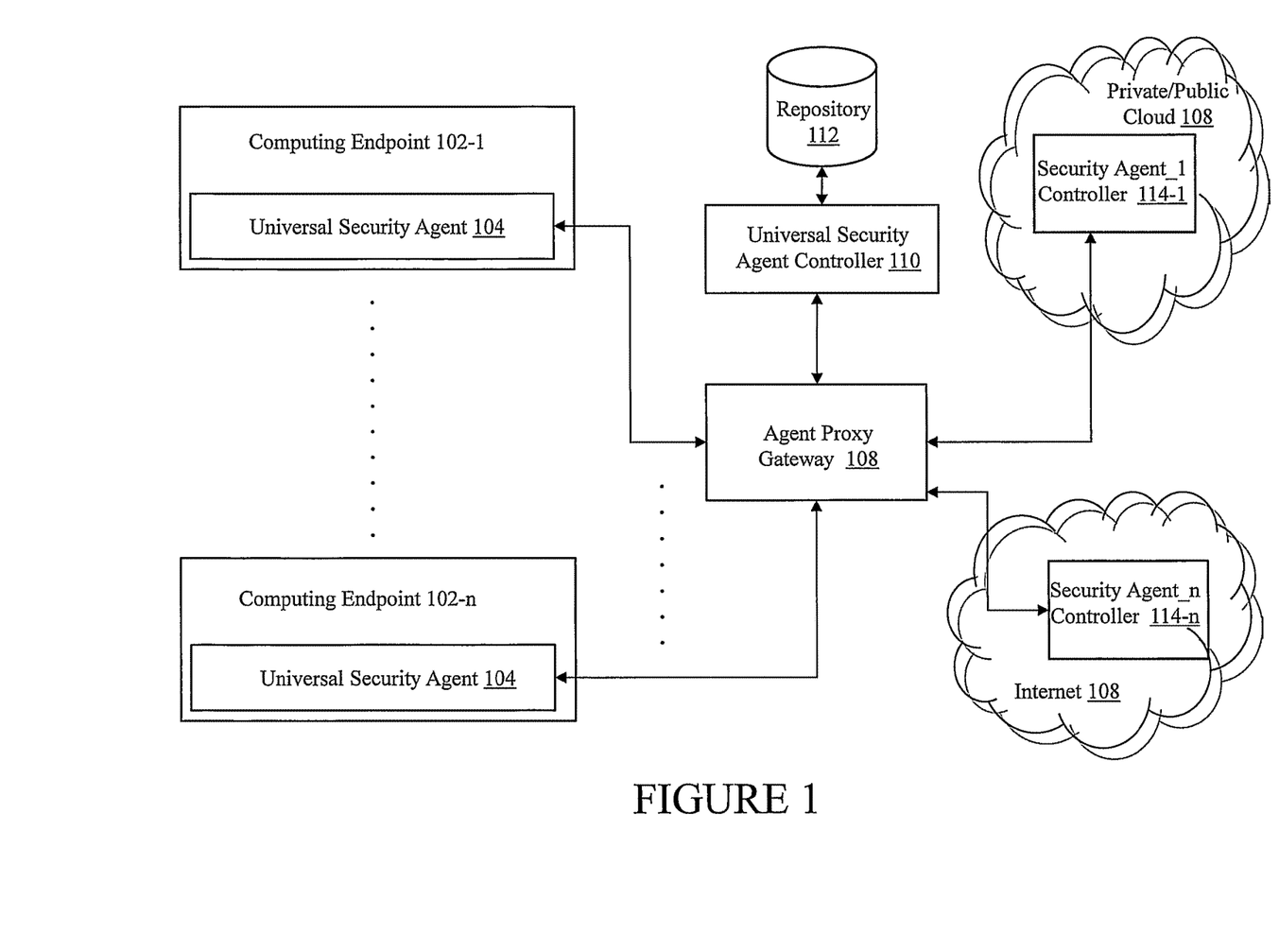
FIG. 1 illustrates one example system using a universal security agent, in accordance with example embodiments of the present disclosure.
Figure 2:
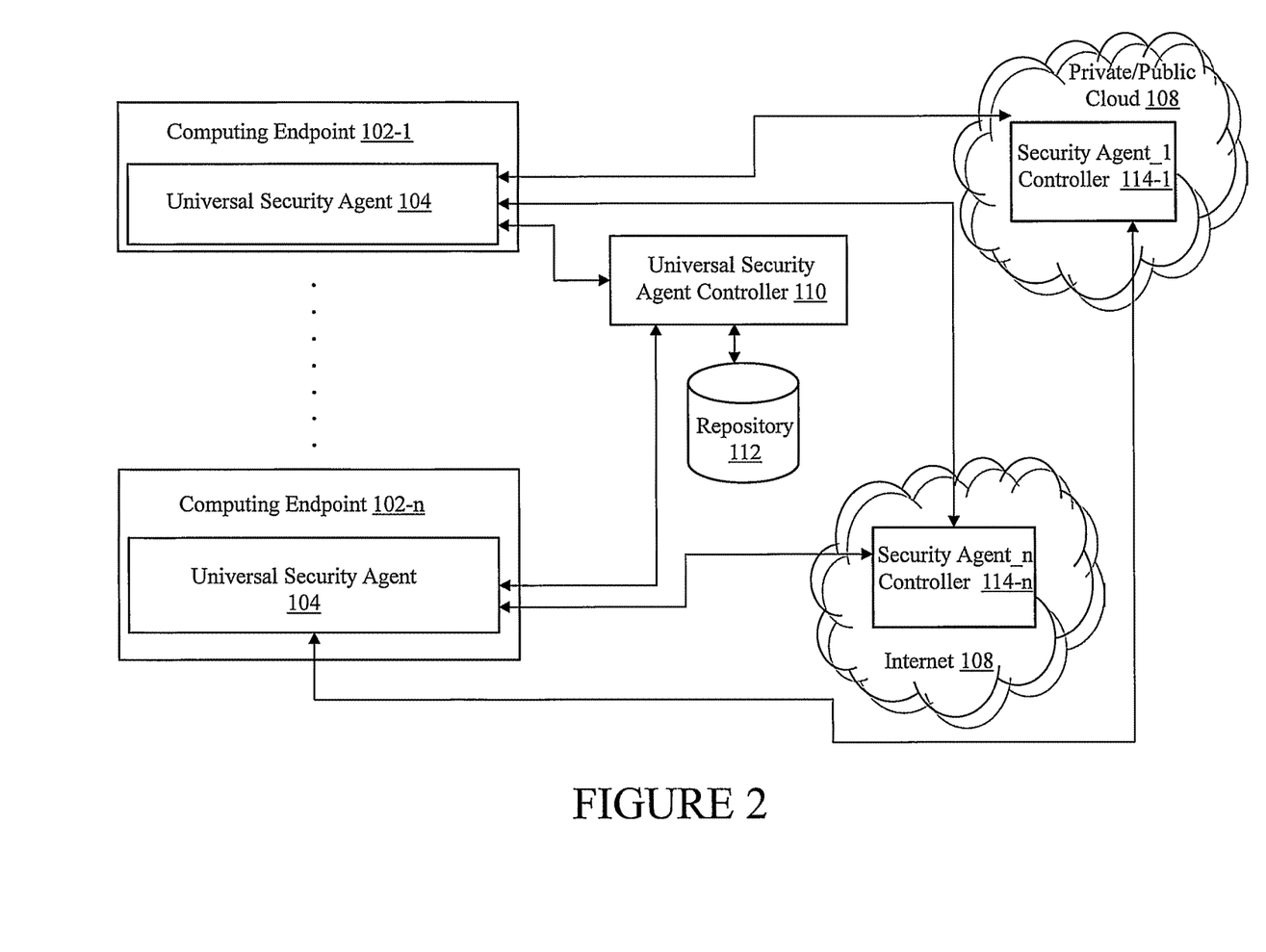
FIG. 2 illustrates another example system using a universal security agent, in accordance with example embodiments of the present disclosure.

FIG. 1 illustrates one example system using a universal security agent, in accordance with example embodiments of the present disclosure; FIG. 2 illustrates another example system using a universal security agent, in accordance with example embodiments of the present disclosure; and FIG. 3 illustrates example elements of the universal security agent deployed on a computing endpoint illustrated in FIGS. 1 and 2, in accordance with example embodiments of the present disclosure.

Figure 3:
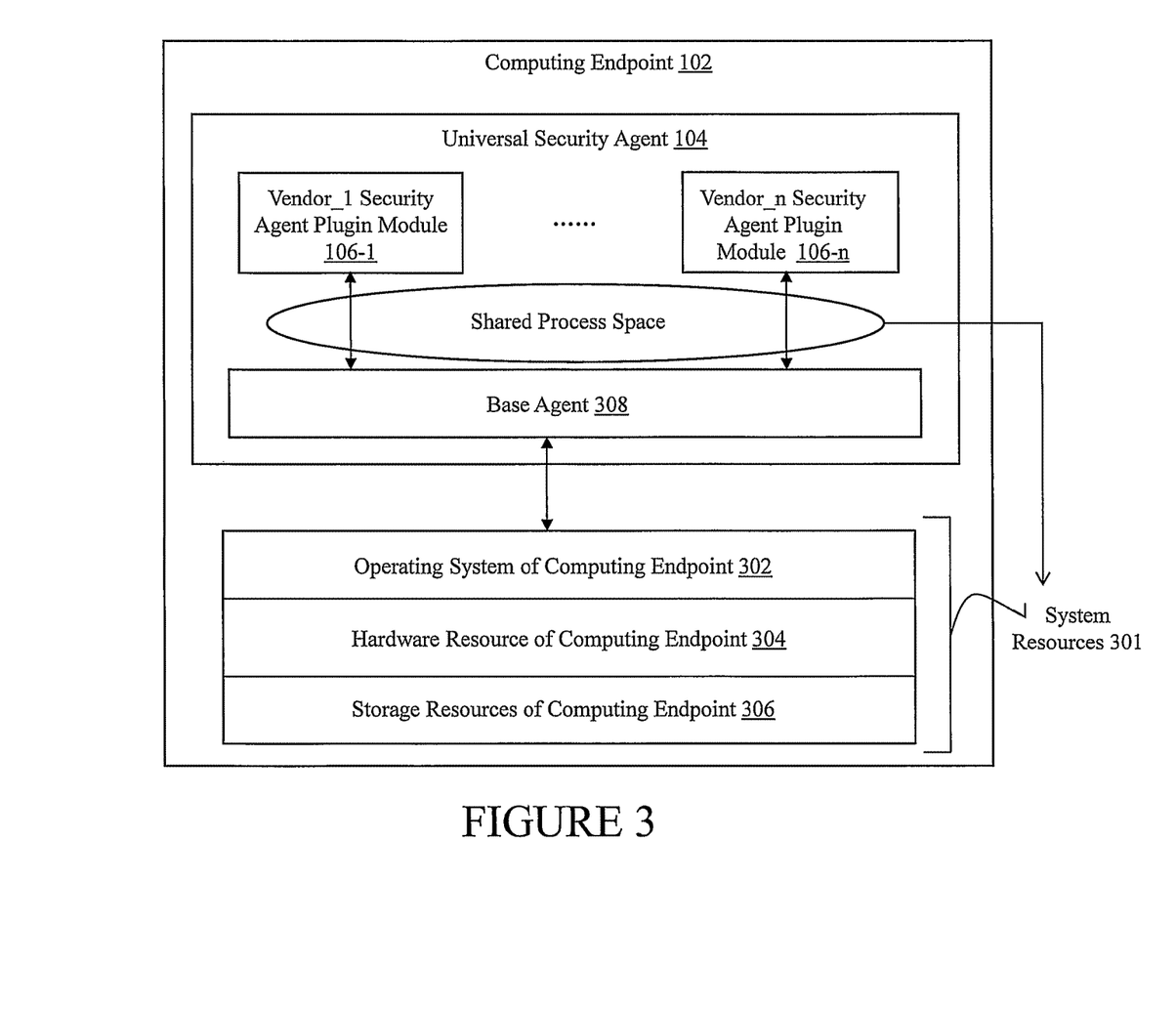
FIG. 3 illustrates example elements of the universal security agent deployed on a computing endpoint as illustrated in FIGS. 1 and 2, in accordance with example embodiments of the present disclosure.

Referring to FIGS. 1-3, the example system 100 may include one or more computing endpoints (102-1 to 102-*n*)

(hereinafter "computing endpoints 102"), where each computing endpoint 102 comprises underlying system resources 301 that provide the inherent capabilities of the computing endpoint and contribute to its overall operation and performance. In particular, the system resources may include hardware resources 304, storage resources 306 that comprise instructions for execution by the hardware resources 304, and/or an operating system 302 that efficiently manages the functions of the hardware and/or storage resources (304, 306). Examples of the computing endpoints 102 may include, but are not limited to, personal computers, virtual machines, servers, mobile devices, Internet of Things (IoT), and/or cloud computing workloads.

Each computing endpoint 102 may include a universal security agent 104 deployed thereon. In one example embodiment, the universal security agent 104 may be a single installable package that may be installed on the computing endpoint 102 using any appropriate software installation mechanism, such as command line installation, e.g., yum, apt-get, etc. However, in another example embodiment, the universal security agent 104 may be installed as multiple packages using any appropriate deployment mechanism without departing from a broader scope of the present disclosure. Alternatively, in yet another example embodiment, the universal security agent 104 may be resident on the computing endpoint 102. The universal security agent may be considered to be resident on the host if it is an embedded system, a software module to execute on the system's operating environment (hardware and/or software, which may include an operating system), or is a standalone physical or software entity mounted on the system.

In one example embodiment, the universal security agent 104 may include a base agent 308 with one or more security agents (106-1-106-n) that are implemented as plugin modules. That is, the one or more security agent plugin modules (106-1-106-n) (herein "security agent plugin modules") may be statically configured as a part of the base agent 308. In said example embodiment, the security agent plugin modules 106 and their respective packages comprising the plugin object (e.g., code) and the plugin policies may already be stored and installed on the computing endpoint 102. Further, in said example embodiment, a plugin configuration file that includes and indicates a list of the security agent plugin modules 106 installed on the computing endpoint 102, policies of each installed security agent plugin module 106, and/or signed digital certificates to validate authenticity of each installed security agent plugin module 106 may be stored in a directory of the computing endpoint 102. Based on information in the plugin configuration file, the base agent 308 may validate and load the security agent plugin modules 106, for operation, to a process space of the computing endpoint 102 that is shared with the base agent 308.

In another example embodiment, the universal security agent 104 may include only the base agent 308. In said another example embodiment, the base agent 308 may be configured to operate in concert with a universal security agent controller 110 to dynamically discover, download, and load the one or more security agent plugin modules 106. Once the security agent plugin modules 106 are downloaded and installed in the computing endpoint 102, if the computing endpoint 102 and/or the base agent 308 reboots/restarts, the base agent 308 may operate in concert with the universal security agent controller 110 to dynamically discover and update the existing security agent plugin modules 106, add new security agent plugin modules 106, and/or remove existing security agent plugin modules 106 that have been deprecated. In addition to operating with security agents that are configured as plugin modules, in some example embodiments, the base agent 308 may be configured to retrofit computing endpoints 102 that already have one or more security agent daemons operating thereon.

In either case, the base agent 308 may be deployed in the computing endpoint 102 such that the base agent 308 logically resides between the security agent plugin modules 106 and the operating system 302 of the computing endpoint 102 to provide a layer of abstraction.

Each security agent plugin module 106 may be configured to monitor various security aspects and/or execute various security functions on the computing endpoint 102. Examples of the one or more security agent plugin modules 106 may include, but are not limited to, an antivirus application/program, an intrusion detection system (IDS), an intrusion prevention system (IPS), a host-based firewall, a compliance agent, a vulnerability scanning agent, an event log, a patch monitor, or other components that perform security functions, generate security alerts, and/or generate security related information. The one or more security agent plugin modules 106 may include third party vendor provided security agents and/or native security agents. For example, if a computing endpoint 102 is a cellular network service provider server, the security agents deployed thereon may include third party vendor provided security agents and/or proprietary service provider specific security agents (native security agents).

Each security agent 106 may be associated with a respective controller 114 that may be coupled over a network to the computing endpoints 102 having the one or more security agents 106. For example, Vendor_1 security agent may be associated with the Vendor_1 controller and Vendor_n security agent may be associated with the Vendor_n controller. Similarly, the base agent 308 may be associated with the universal security agent controller 110 which in turn is coupled to a repository 112 that maintains plugin policies, plugin objects, and/or other relevant plugin information associated with the security agent plugin modules 106.

The controllers (110, 114) may be a physical entity, a software module, and/or a service deployed at a security server, a private/public cloud, or the Internet. Agents (106, 104) and controllers (114, 110) may thus have an interrelationship for data exchange, and/or management action by a controller based on information from an agent. The interrelationship may be referred to by expressing that an agent (104, 106) corresponds to or is associated with a controller (110, 114), or vice versa. For example, configuration settings may be sent from the controller 114 to the security agent plugin module 106 or data may be passed between a security agent plugin module 106 and a controller 114 that relates to security alerts that may indicate a vulnerability, an attack, a failure, an anomalous execution event, or corrupt data.

Even though the present disclosure describes each agent being associated with its respective controller, one of ordinary skill in the art can understand and appreciate that in other example embodiments, one or more controllers may be associated with a single agent or alternatively, a single controller may manage multiple agents, and thus be associated with the multiple agents without departing from a broader scope of the present disclosure.

In one example embodiment, as illustrated in FIG. 1, each agent (106, 104) may communicate with its respective controller (114, 110) via an agent proxy gateway 108 (herein "proxy gateway") as a security measure for the computing endpoints 102 and/or protecting privacy/identity of the computing endpoints 102 from the external security agent controllers 114 or other network elements. Alternatively, in another example embodiment, as illustrated in FIG. 2, the security agents 106 may communicate directly with their respective controllers through the base agent 308 without the agent proxy gateway 108. In the example illustrated in FIG. 2, the base agent 308 may validate that the security agents 106 that are coupled to the base agent 104 are authorized to communicate with their respective controllers 114 based on information in the plugin policies associated with the respective security agent plugin modules 106. In either of the foregoing example embodiments, all communications from the security agents 106 are configured to be routed through the base agent 308.

In addition to discovering, authenticating, loading, routing traffic, and/or validating communications associated with the security agent plugin modules 106, the base agent 308 may be configured to schedule, coordinate, and/or prioritize different plugin tasks associated with each security agent plugin module 106. Further, the base agent 308 may be configured to perform policy inspection and enforcement for system access requests from the different security agent plugin modules 106. In some example embodiments, the base agent 308 may be configured to consolidate and encrypt all communication from the security agent plugin modules 106 for transmission as a single session to the proxy gateway 108 as illustrated in FIG. 1. The different modules of the base agent 308 and an example method of operation of the base agent 308 will be described below in greater detail in association with FIGS. 4-8.

Figure 4:
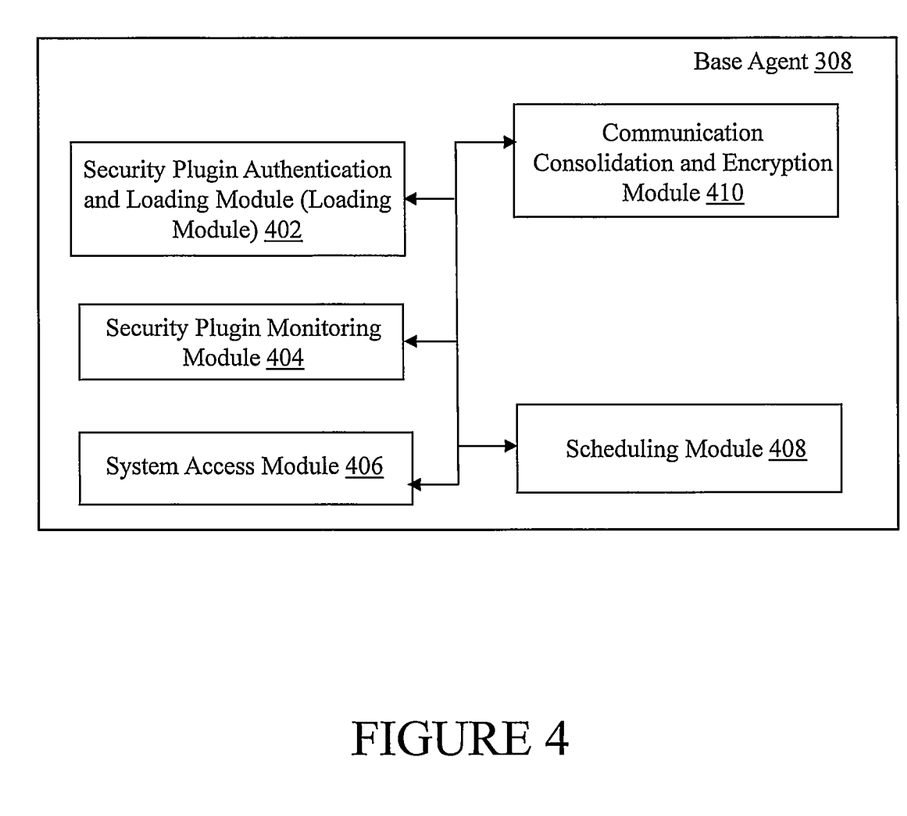
FIG. 4 illustrates a functional block diagram of the base agent of the universal security agent of FIGS. 1 and 2, in accordance with example embodiments of the present disclosure.
Figure 5:
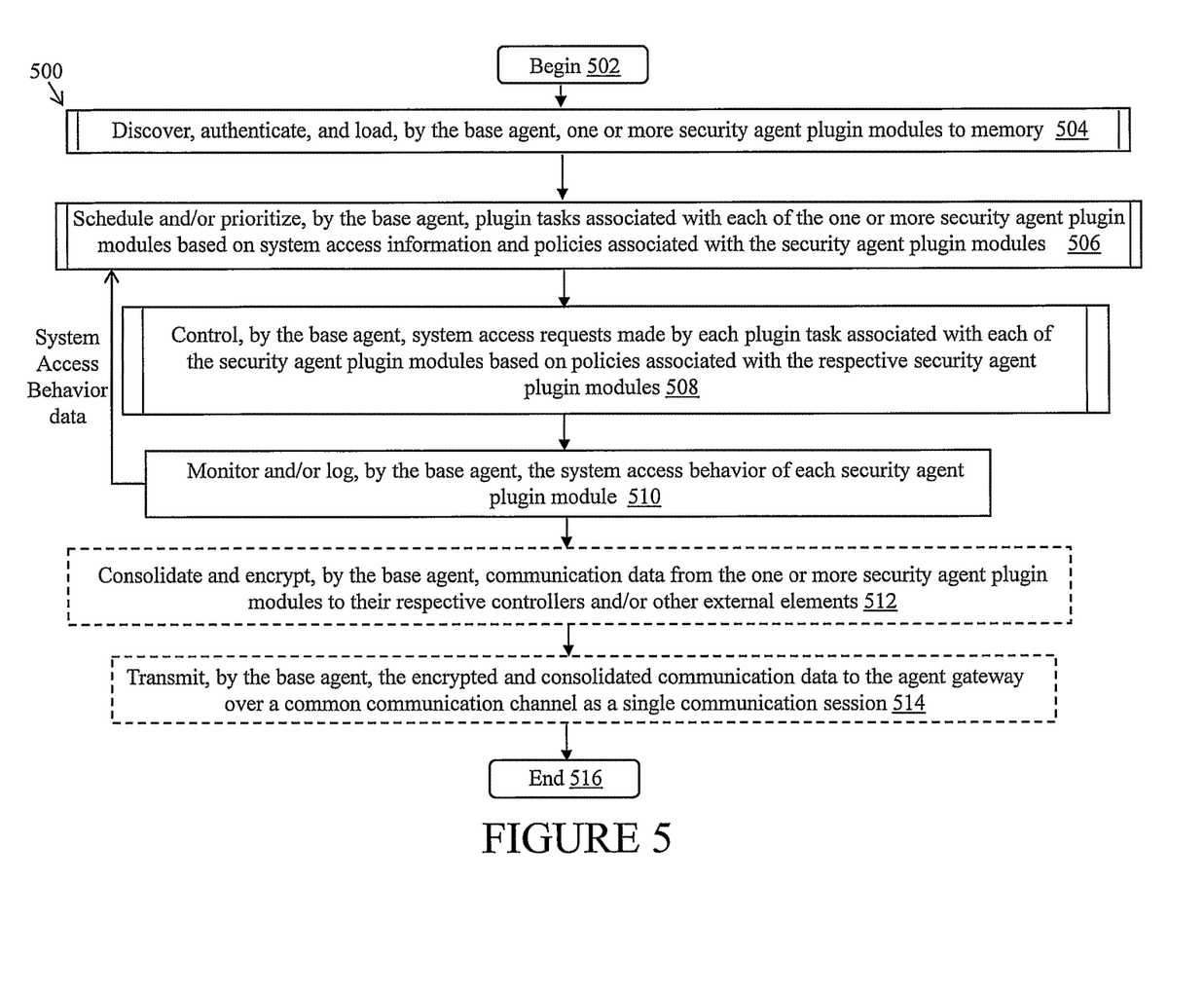
FIG. 5 is a flow chart that illustrates an example method of the universal security agent of FIGS. 1 and 2, in accordance with example embodiments of the present disclosure.
Figure 6:
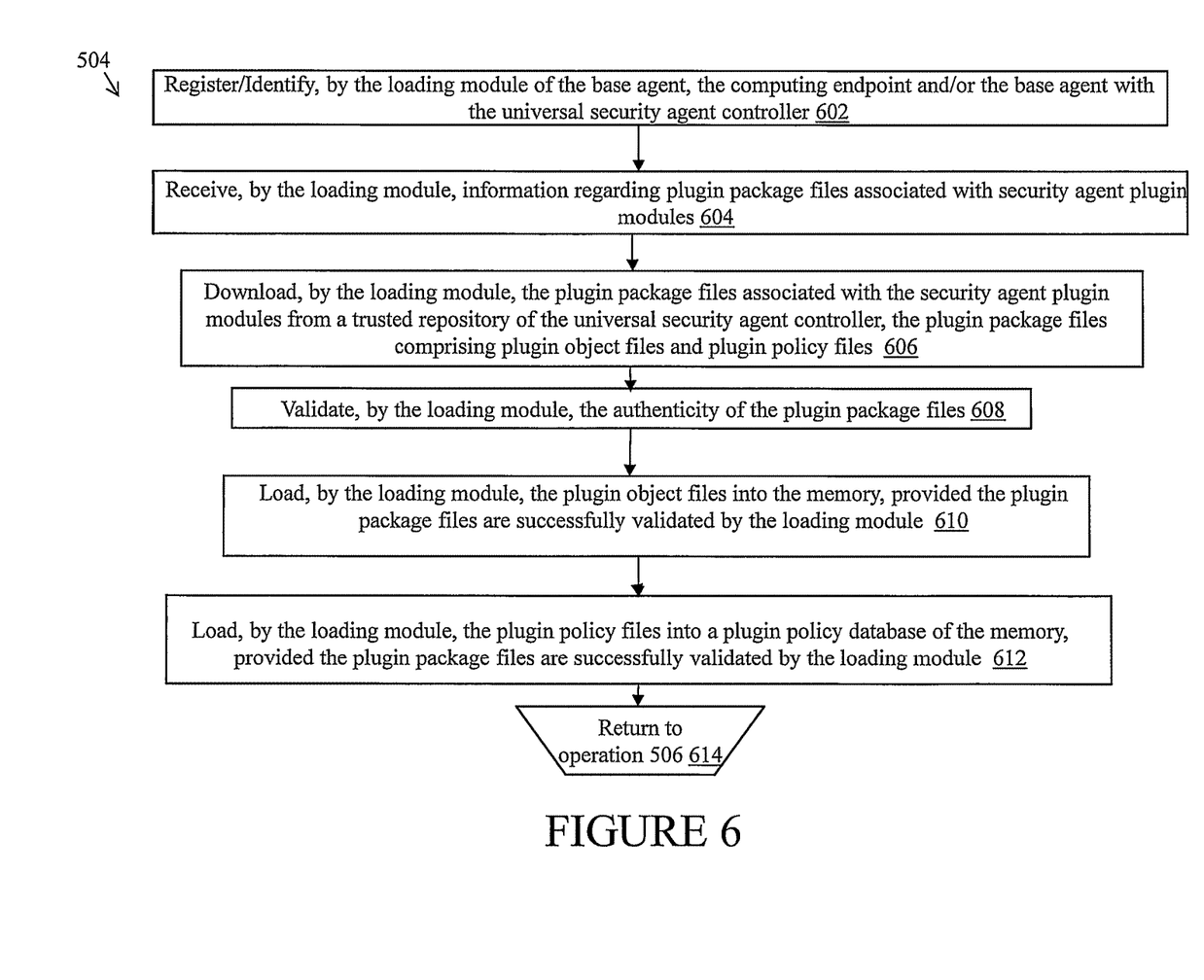
FIG. 6 is a flow chart that illustrates an example method of an authentication and loading module of the universal security agent, in accordance with example embodiments of the present disclosure.
Figure 7:
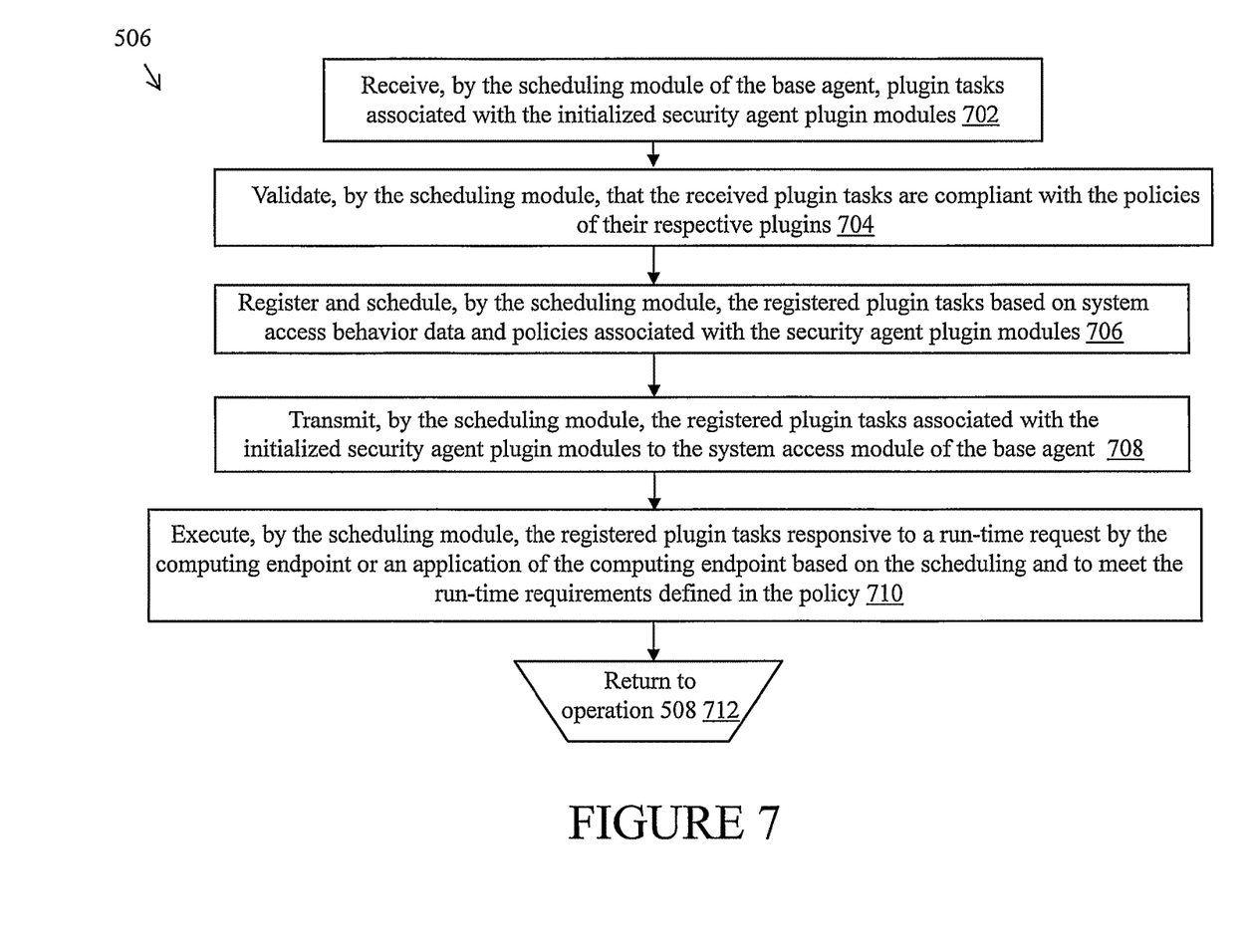
FIG. 7 is a flow chart that illustrates an example method of a scheduling module of the universal security agent, in accordance with example embodiments of the present disclosure.
Figure 8:
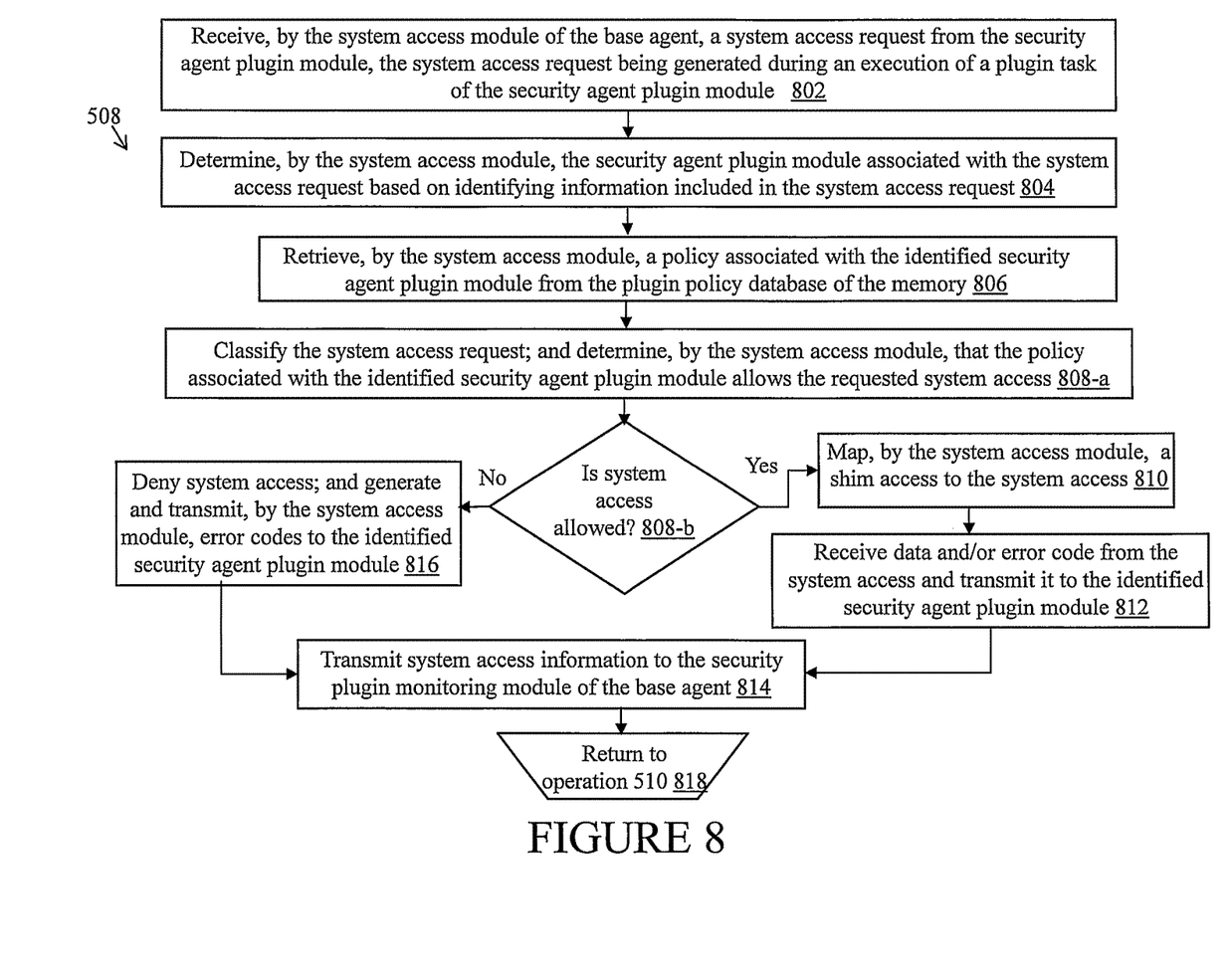
FIG. 8 is a flow chart that illustrates an example method of a system access module of the universal security agent, in accordance with example embodiments of the present disclosure.

Turning to FIGS. 4-8, FIG. 4 illustrates a functional block diagram of the base agent of the universal security agent of FIGS. 1 and 2, in accordance with example embodiments of the present disclosure; FIG. 5 is a flow chart that illustrates an example method of the universal security agent of FIGS. 1 and 2, in accordance with example embodiments of the present disclosure; FIG. 6 is a flow chart that illustrates an example method of an authentication and loading module of the universal security agent, in accordance with example embodiments of the present disclosure; FIG. 7 is a flow chart that illustrates an example method of a scheduling module of the universal security agent, in accordance with example embodiments of the present disclosure; and FIG. 8 is a flow chart that illustrates an example method of a system access module of the universal security agent, in accordance with example embodiments of the present disclosure.

Referring to FIG. 4, the base agent 308 may include the security plugin authentication and loading module 402 (herein "loading module"), a security plugin monitoring module 404, a system access module 406, a scheduling module 408, and/or a communication consolidation and encryption module 410. In an example embodiment, the base agent 308 that is deployed on the computing endpoint 102 may utilize a hardware resource 304 of the computing endpoint 102, such as a processor, to execute instructions associated with the base agent 308 and stored in a storage resource 306 of the computing endpoint 102, such as a memory, to perform the operations of the different base agent modules 402-408 with assistance from the operating system 302 of the computing endpoint 102.

The various modules of the base agent 308, e.g., modules 402-408, and their specific operations will be described in greater detail below by making reference to FIGS. 5-8 as and when needed. Although specific operations are disclosed in the flowcharts illustrated in FIGS. 5-8, such operations are examples. That is, embodiments of the present disclosure are well-suited to performing various other operations or variations of the operations recited in the flowcharts. It is appreciated that the operations in the flowcharts illustrated in FIGS. 5-8 may be performed in an order different than presented, and that not all of the operations in the flowcharts may be performed.

All, or a portion of, the embodiments described by the flowcharts illustrated in FIGS. 5-8 can be implemented using computer-readable and computer-executable instructions which reside, for example, in computer-usable media of a computer system or like device. As described above, certain processes and operations of the present disclosure are realized, in one embodiment, as a series of instructions (e.g., software programs) that reside within computer readable memory of a computer system and are executed by the processor of the computer system. When executed, the instructions cause the computer system to implement the functionality of the security system as described below.

Referring to FIG. 5, an example method 500 of the base agent starts at step 502 and proceeds to operation 504 where the base agent discovers, authenticates, and loads at least one of the one or more security agent plugin modules. In one example embodiment, the security agent plugin modules 106 may be statically configured as a part of the base agent 308, i.e., configured as a single installable package. In said example embodiment, the base agent 308 may access a plugin configuration file that includes a list of security agent plugin modules 106 present, policies associated with the respective plugin modules, and/or signed certificates to validate the authenticity of the plugin modules. Accordingly, in said example embodiment, a loading module 402 of the base agent 308 may authenticate and load the security agent plugin modules 106 using the plugin configuration file. Alternatively, in other example embodiments, the loading module 402 of the base agent 308 may operate in concert with the universal security agent controller 110 to dynamically authenticate and load the security agent plugin modules 106 through a discovery process over a secure network connection. The dynamic loading of the security agent plugin modules 106 by the loading module 402 of the base agent 308 in operation 504 will be described in greater detail below in association with FIG. 6.

Referring to FIGS. 4 and 6, in operation 602 the loading module 402 of the base agent 308 may register with the universal security agent controller 110 to identify itself to the universal security agent controller 110. For example, the loading module 402 may provide identification information such as, but not limited to, the type of computing endpoint, the name of the computing endpoint, an application type, and/or an operating system, to the universal security agent controller 110. Upon receiving the identification information, in operation 604, the universal security agent controller 110 may categorize the computing endpoint 102 and provide information regarding plugin package files associated with one or more security agent plugin modules that are to be installed on the computing endpoint 102. Said information may be provided based on the category in which the computing endpoint 102 belongs and/or any other appropriate information associated with the base agent 308 or the computing endpoint 102. For example, if the computing endpoint 102 is classified as a category X computing endpoint, the universal security agent controller 110 may provide information regarding plugin package files associated with security agent plugin modules A and B that are recommended to be installed on any computing endpoint that falls under category X. The universal security agent controller 110 may be coupled to a trusted repository 112 that stores the plugin package files of one or more security agent plugin modules 106.

In some example embodiments where one or more security agent plugin modules 106 have already been discovered, downloaded, and/or installed on the computing endpoint 102 and the computing endpoint 102 (and/or the base agent 308) reboots, in operation 602, in addition to the identification information, the base agent 308 may provide the universal security agent controller 110 with a list of security agent plugins 106 (and/or their versions) that are currently downloaded and/or installed on the computing endpoint 102. Responsively, in operation 604, the universal security agent controller 110 may provide any updates associated with each of the already downloaded and/or installed security agent plugin modules 106 in the received list, if any. Alternatively, the universal security agent controller 110 may provide plugin packages associated with new security agent plugin modules 106 for the computing endpoint 102 or provide information regarding deprecated security agent plugin modules 106 that need to be removed from the computing endpoint 102.

In an example embodiment, the plugin package files associated with a security agent plugin module 106 may include, but are not limited to, a plugin object file, a plugin policy file, and a signed digital certificate associated with the plugin package files. The plugin package files may be provided by the universal security agent controller 110 from the trusted repository 112 that is coupled to the universal security agent controller 110. The plugin packages files may be stored in the repository 112 and may be used to dynamically load the security agent plugin modules 106.

In operation 606, the loading module 402 of the base agent 308 may download the plugin package files associated with each of the recommended security agent plugin modules 106 from the trusted repository 112. In some example embodiments such as where the plugin package files are dynamically discovered, in operation 606, the loading module 402 may copy the downloaded plugin package files to a storage medium, such as a disk, of the computing endpoint 102 and/or update the plugin configuration file.

After downloading and/or copying the plugin packages associated with the configured security agent plugin modules 106 and prior to loading the plugin packages, in operation 608, the loading module 402 of the base agent 308 may validate an authenticity of the plugin package files, e.g., plugin object file and plugin policy file of each downloaded security agent plugin module 106. In one example embodiment, the loading module 402 may validate the plugin package files by computing a checksum/hash of the plugin package files and comparing the checksum/hash to a signed digital certificate associated with the plugin package files that is provided in the plugin package files. However, in other example embodiments, any other appropriate verification mechanism may be used without departing from a broader scope of the present disclosure.

Responsive to a successful validation, in operation 610, the loading module 402 may dynamically load the plugin object file (e.g., a library file) of a successfully validated plugin package file into a process space (e.g., address space) of the computing endpoint 102. The base agent 308 and the security agent plugin modules 106 may share the same process space in some example embodiments. Further, in operation 612, the loading module 402 may load the policy files of the successfully validated plugin package file into a plugin policy database. A unique plugin identifier may be used to identify a plugin's policy within the plugin policy database. The plugin policy database may be an in-memory database. In some example embodiments, existing policies associated with existing security agent plugin modules may be replaced with updated policies, if any, during this process (e.g., scenario when the computing endpoint 102 or the base agent 308 reboots and receives updates from controller 110).

Responsive to loading the validated plugin package files of the successfully validated security agent plugin modules 106, the method 504 of the loading module 402 returns to operation 506 in FIG. 5.

Returning to FIG. 5, upon successfully loading the security agent plugin modules 106 into memory, in operation 506, the loading module 402 may operate in concert with the scheduling module 408 to initialize each of the loaded security agent plugin modules by generating appropriate plugin initialization function calls. The initialization allows the security agent plugin modules 106 and/or the computing endpoint 102 to perform appropriate initialization tasks required before operation of the security agent plugin module, such as, allocation of memory and resources to be shared by different instances of the security agent plugin module, and registration of plugin tasks.

Responsive to initializing the loaded security agent plugin modules 106, in operation 506, the scheduling module 408 may operate in concert with the security plugin monitoring module 404 to schedule and/or prioritize plugin tasks associated with each initialized security agent plugin module 106. An example method 506 of the scheduling module 408 will be described in greater detail below in association with FIG. 7.

Referring to FIGS. 4 and 7, as a part of initialization, in operation 702, each security agent plugin module 106 may register one or more of its plugin tasks, e.g., callbacks, with the scheduling module 408. Additionally, along with the plugin tasks, the security agent plugin modules 106 may provide execution requirements associated with each plugin task, e.g., if a plugin task is to be defined once or dispatched periodically multiple times. Each security agent plugin module 106 supplies their respective plugin tasks and execution requirements associated with each plugin task to the scheduling module 408 of the base agent 308 via registration requests. In some example embodiments, the execution requirements may be defined in the plugin's policies.

Responsive to receiving the plugin tasks and/or execution requirements from the security agent plugin modules 106, in operation 704, the scheduling module 408 of the base agent 308 may validate that the received plugin tasks are defined within the policy files associated with the respective security agent plugin modules 106. The validation may be performed each time the plugin task is defined and/or dispatched.

Upon successful validation, in operation 706, the scheduling module 408 may schedule and/or prioritize the plugin tasks (e.g., firewall access, file write) from one or more of the security agent plugin modules 106 based on the execution requirements associated with the plugin tasks, the policies associated with the security agent plugin modules that provided the plugin tasks, and/or system access information (behavior) associated with the security agent plugin modules that provided the plugin tasks. The system access information may be received from the security plugin monitoring module 404 of the base agent 308 as will be described in association with FIG. 8. In particular, the scheduling and/or prioritization of the plugin tasks by the scheduling module 408 may be controlled such that contention for simultaneous access of system resources 301 may be mitigated or avoided.

Responsive to registering and/or scheduling the plugin tasks of the initialized security agent plugin modules 106, in operation 708, the scheduling module 408 may share information associated with the registered plugin tasks with the system access module 406 of the base agent 308. Said information associated with the registered plugin tasks may include, but is not limited to, a plugin identifier, memory address information, and/or other identifying information of the registered plugin tasks and the security agent plugin modules associated with the registered plugin tasks. Further, in operation 710, the scheduling module 408 may execute the plugin tasks of the security agent plugin modules 106, and coordinate the execution based on the defined schedule and/or priority of the plugin tasks. In particular, during run-time, in operation 710, the scheduling module 408 may appropriately size the plugin tasks of each security agent plugin module 106 and execute (e.g., launch/run) the plugin tasks of each security agent plugin module 106 to meet one or more run-time requirements defined in the policy files associated with the respective security agent plugin module 106. For example, if a plugin tasks requests 'x' amount of run-time and the policy defines providing 'y' amount of runtime, where y<x, the scheduling module may appropriately size the plugin task. Responsive to execution of the plugin tasks, the method 506 of scheduling module 408 returns to operation 508 in FIG. 5.

Returning to FIG. 5, in operation 508, the system access module 406 of the base agent 308 may control and validate system access requests generated by one or more of the executed plugin tasks based on policies associated with the respective security agent plugin modules. In particular, in operation 508, the system access module 406 may perform policy inspection and enforcement for validating and controlling system access requests. Operation 508 will be described in greater detail below in association with FIG. 8.

Referring to FIGS. 4 and 8, in operation 802, the system access module 406 of the base agent 308 may receive system access requests, e.g., a file access request, from one or more security agent plugin modules 106 during execution of plugin tasks associated with the one or more security agent plugin modules 106 by the scheduling module 408. The system access requests may include identifying information associated with the plugin task that resulted in the generation of said system access request. Accordingly, responsive to receiving the system access request, in operation 804, the system access module 406 may dynamically determine the security agent plugin module associated with the received system access request based on the information associated with the registered plugin tasks and/or the security plugin modules associated with the registered plugin tasks received from the scheduling module 406.

Responsive to identifying the security agent plugin module 106 associated with the plugin task requesting the system access, in operation 806, the system access module 406 may look up and retrieve the plugin policy associated with the identified security agent plugin module 106 in the plugin policy database. Then, in operations 808-a and 808-b, the system access module 406 may classify the system access request and determine whether the requested system access by the identified security agent plugin module 106 is allowed by inspection of the retrieved plugin policy associated with the identified security agent plugin module 106.

In one more example embodiments, the system access module 406 may operate as a system access shim for each security agent plugin module that requires system access during execution of its plugin tasks. Accordingly, responsive to a positive determination that the requested system access is allowed, in operation 810, the system access module 406 may map a shim access to the appropriate system access as per the plugin policy associated with the identified security agent plugin module 106. The mapping may be unique and dependent on the operating system and/or type of the computing endpoint 102. Further, in operation 810, the security agent plugin module 106 may access one or more system resources. Responsively, in operation 812, the system access may return any relevant data and/or error code to the system access module 406 which in turn supplies the received data and/or error code back to the security agent plugin module 106 that requested the system access. Additionally, in operation 814, the system access module 406 may send system access details associated with security agent plugin modules to the security plugin monitoring module 404 of the base agent 308. In other words, the system access module 406 may transmit details regarding all system access activities across all the appropriate security agent plugin modules 106.

However, if it is determined that the requested system access is not allowed in operation 808-b, then, the method 800 of the system access module 406 proceeds to operation 816 where the system access module 406 may deny system access to the requesting security agent plugin module 106 and supply appropriate error codes to the requesting security agent plugin module 106. Then, the method 508 of the system access module 406 returns to operation 510 in FIG. 5.

Returning to FIG. 5, in operation 510, the security plugin monitoring module 404 may monitor and/or log the system access behavior of each security agent plugin module. In particular, the security plugin monitoring module 404 may determine the system access behavior based on the system access information that is received from the system access module 406 of the base agent 308. Additionally, in operation 510, the security plugin monitoring module 404 may provide system access behavior data as feedback to the scheduling module 408, which in turn may control the scheduling and/or prioritization of plugin tasks based on the received system access behavior data along with the plugin policies as described above is association with FIG. 7. Examples of controlling the scheduling based on the system access behavior data may include, but is not limited to, throttling plugin tasks of a security agent plugin module, restarting plugin tasks a security agent plugin module, terminating plugin tasks of a security agent plugin module, etc.

Furthermore, in some example embodiments such as the embodiment illustrated in FIG. 1 where a proxy gateway 108 is used for communication, in operations 512 and 514, the communication control and encryption module 410 of the base agent 308 may multiplex communication data from the security agent plugin modules 106 to their respective controllers 114 or other external elements. Further, the communication control and encryption module 410 may encrypt the multiplexed communication data and transmit the multiplexed and encrypted communication data to the proxy gateway 108 as a single communication session over a common communication channel. Responsive to receiving the multiplexed and encrypted communication data, the proxy gateway 108 may decrypt and de-multiplex the receiving communication data. Further, the proxy gateway 108 may transmit each security agent plugin module's communication to its respective controller 114 by masking an identity of the computing endpoint 102. That is, the data sent from the proxy gateway 108 to the controller 114 may indicate the source address of the data packet as the network address of the proxy gateway 108 rather than the computing endpoint 102. Similarly, all communications from the controllers 114 to the computing endpoints 102 may also be transmitted via the proxy gateway 108.

It is noted that operations 512 and 514 are optional and in some example embodiments said operations 512 and 514 may be omitted without departing from a broader scope of the present disclosure. For instance, in the example embodiment illustrated in FIG. 2, operations 512 and 514 may be omitted. Instead, in said embodiment of FIG. 2, the base agent 308 may directly communicate with the security agent controllers 114, provided the destination of the communications from the security agent plugin modules 106 are compliant with the policies associated with the security agent plugin modules 106. The method 500 of the base agent 308 then proceeds to operation 516 to end the process.

Although the present embodiments have been described with reference to specific example embodiments, it will be evident that various modifications and changes may be made to these embodiments without departing from the broader spirit and scope of the various embodiments. For example, the various devices, modules, and agents (e.g., the base agent, the modules comprising the base agent, and the security agent plugin modules) described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    loading, by a base agent of a universal security agent deployed on a computing endpoint, a security agent plugin module into a memory associated with the computing endpoint;
    registering, by the base agent, a plugin task of the security agent plugin module;
    scheduling, by the base agent, the plugin task of the security agent plugin module based on one of a policy associated with the security agent plugin module and system access information associated with the security agent plugin module;
    executing, by the base agent, the plugin task based on the scheduling;
    controlling, by the base agent, a request for system access generated during the execution of the plugin task based on an inspection of the policy associated with the security agent plugin module; and
    monitoring and logging, by the base agent, system access information associated with the security agent plugin module, the system access information comprising data associated with the request for system access,
        wherein controlling the request for system access comprises:
            receiving, by the base agent, the request for system access, the request for system access comprising identifying information associated with the security agent plugin module;
            based on the identifying information, determining, by the base agent, that the security agent plugin module is associated with the request for system access;
            retrieving, by the base agent, the policy associated with the security agent plugin module from a plugin policy database of the memory of the computing endpoint;
            determining, by the base agent, that the policy allows the request for system access by the security agent plugin module; and
            interacting, by the base agent, with system resources of the computing endpoint based on an allowed system access request by the security agent plugin module.

2. The method of claim 1, wherein loading the security agent plugin module comprises:
    registering the base agent with a universal security agent controller that is communicably coupled to the universal security agent over a communication network;
    transmitting, by the base agent, a current list of configured security agent plugin modules to the universal security agent controller, the current list of configured security agent plugin modules comprising the security agent plugin module;
    downloading, by the base agent, plugin package files associated with the security agent plugin module that are received from a repository associated with the universal security agent controller in response to transmitting the current list of configured security agent plugin modules; and
    loading, by the base agent, the plugin package files associated with the security agent plugin module to the memory associated with the computing endpoint.

3. The method of claim 2:
    wherein the plugin package files of the security agent plugin module comprise a plugin policy file that defines the policy associated with the security agent plugin module, a plugin object file, and a signed digital certificate of the plugin package files; and
    wherein loading the plugin package files comprises:
        validating, by the base agent, an authenticity of the plugin package files associated with the security agent plugin module prior to loading the plugin package files;
        loading, by the base agent, the plugin object file into the memory associated with the computing endpoint; and
        loading, by the base agent, the plugin policy file into a plugin policy database of the memory.

4. The method of claim 3, wherein validating comprises:
    generating, by the base agent, a hash of the plugin package files associated with the security agent plugin module; and
    determining, by the base agent, that the hash of the plugin package files matches the signed digital certificate of the plugin package files.

5. The method of claim 1, wherein registering the plugin task comprises:
    receiving, by the base agent, a registration request comprising the plugin task of the security agent plugin module after an initialization of the security agent plugin module that is loaded; and
    validating, by the base agent, that the plugin task is compliant with the policy associated with the security agent plugin module.

6. The method of claim 1, wherein the scheduling of the plugin task of the security agent plugin module is controlled to avoid contention of the security agent plugin module with another security agent plugin module for simultaneous access of system resources of the computing endpoint.

7. The method of claim 1, further comprising:
receiving, by the base agent, one of data and an error code in response to the allowed system access request; and
transmitting, by the base agent, one of the data and the error code to the security agent plugin module associated with the allowed system access request.

8. The method of claim 1, further comprising:
transmitting, by the base agent, an error code to the security agent plugin module when the policy associated with the security agent plugin module does not allow the request for system access.

9. The method of claim 1, further comprising:
multiplexing and encrypting, by the base agent, communication data from the security agent plugin module and another security agent plugin module deployed on the computing endpoint to generate multiplexed and encrypted communication data; and
transmitting, by the base agent, the multiplexed and encrypted communication data from the security agent plugin module and the another security agent plugin module to a proxy gateway as a single communication session over a common communication channel.

10. The method of claim 1, further comprising transmitting, by the base agent, communication data from the security agent plugin module to a controller associated with the security agent plugin module based on the policy associated with the security agent plugin module, the controller being located remotely from the computing endpoint.

11. A non-transitory tangible computer-readable medium comprising a plurality of instructions, which, when executed by a base agent deployed in a computing endpoint, cause the base agent to perform operations comprising:
receiving a plugin task of a security agent plugin module deployed on the computing endpoint;
scheduling the plugin task of the security agent plugin module based on one of a policy associated with the security agent plugin module and system access information associated with the security agent plugin module;
executing the plugin task based on the scheduling;
controlling a request for system access generated during the executing of the plugin task based on an inspection of the policy associated with the security agent plugin module;
monitoring and logging system access information associated with the security agent plugin module, the system access information comprising data associated with the request for system access;
multiplexing and encrypting communication data from the security agent plugin module and another security agent plugin module deployed on the computing endpoint to generate multiplexed and encrypted communication data; and
transmitting the multiplexed and encrypted communication data from the security agent plugin module and the another security agent plugin module to a proxy gateway as a single communication session over a common communication channel,
wherein controlling the request for system access comprises:
receiving, by the base agent, the request for system access, the request for system access comprising identifying information associated with the security agent plugin module;
based on the identifying information, determining, by the base agent, that the security agent plugin module is associated with the request for system access;
retrieving, by the base agent, the policy associated with the security agent plugin module from a plugin policy database of the memory of the computing endpoint;
determining, by the base agent, that the policy allows the request for system access by the security agent plugin module; and
interacting, by the base agent, with system resources of the computing endpoint based on an allowed system access request by the security agent plugin module.

12. The non-transitory tangible computer readable medium of claim 11, wherein receiving the plugin task comprises:
receiving a registration request comprising the plugin task of the security agent plugin module after an initialization of the security agent plugin module; and
validating that the plugin task is compliant with the policy associated with the security agent plugin module.

13. The non-transitory tangible computer readable medium of claim 11, wherein the scheduling of the plugin task of the security agent plugin module is controlled to avoid contention of the security agent plugin module with another security agent plugin module for simultaneous access of system resources of the computing endpoint.

14. The non-transitory tangible computer readable medium of claim 11, further comprising instructions to perform operations comprising:
receiving one of data and an error code in response to the allowed system access request; and
transmitting one of the data and the error code to the security agent plugin module associated with the allowed system access request.

15. The non-transitory tangible computer readable medium of claim 11, further comprising instructions to perform operations comprising:
transmitting an error code to the security agent plugin module when the policy associated with the security agent plugin module does not allow the request for system access.

16. A method comprising:
loading, by a base agent of a universal security agent deployed on a computing endpoint, a security agent plugin module into a memory associated with the computing endpoint;
registering, by the base agent, a plugin task of the security agent plugin module;
scheduling, by the base agent, the plugin task of the security agent plugin module based on one of a policy associated with the security agent plugin module and system access information associated with the security agent plugin module;
executing, by the base agent, the plugin task based on the scheduling;
controlling, by the base agent, a request for system access generated during the execution of the plugin task based on an inspection of the policy associated with the security agent plugin module; and
monitoring and logging, by the base agent, system access information associated with the security agent plugin module, the system access information comprising data associated with the request for system access,
wherein loading the security agent plugin module comprises:

registering the base agent with a universal security agent controller that is communicably coupled to the universal security agent over a communication network;

transmitting, by the base agent, a current list of configured security agent plugin modules to the universal security agent controller, the current list of configured security agent plugin modules comprising the security agent plugin module;

downloading, by the base agent, plugin package files associated with the security agent plugin module that are received from a repository associated with the universal security agent controller in response to transmitting the current list of configured security agent plugin modules; and loading, by the base agent, the plugin package files associated with the security agent plugin module to the memory associated with the computing endpoint.

17. The method of claim 16:

wherein the plugin package files of the security agent plugin module comprise a plugin policy file that defines the policy associated with the security agent plugin module, a plugin object file, and a signed digital certificate of the plugin package files; and wherein loading the plugin package files comprises:

validating, by the base agent, an authenticity of the plugin package files associated with the security agent plugin module prior to loading the plugin package files;

loading, by the base agent, the plugin object file into the memory associated with the computing endpoint; and loading, by the base agent, the plugin policy file into a plugin policy database of the memory.

18. The method of claim 17, wherein validating comprises:

generating, by the base agent, a hash of the plugin package files associated with the security agent plugin module; and determining, by the base agent, that the hash of the plugin package files matches the signed digital certificate of the plugin package files.

19. The method of claim 16, wherein registering the plugin task comprises:

receiving, by the base agent, a registration request comprising the plugin task of the security agent plugin module after an initialization of the security agent plugin module that is loaded; and validating, by the base agent, that the plugin task is compliant with the policy associated with the security agent plugin module.

20. The method of claim 16, wherein the scheduling of the plugin task of the security agent plugin module is controlled to avoid contention of the security agent plugin module with another security agent plugin module for simultaneous access of system resources of the computing endpoint.

* * * * *